July 9, 1940. O. BOCHMANN 2,207,495
ROLLER BEARING TWISTING SPINDLE
Filed Dec. 31, 1936
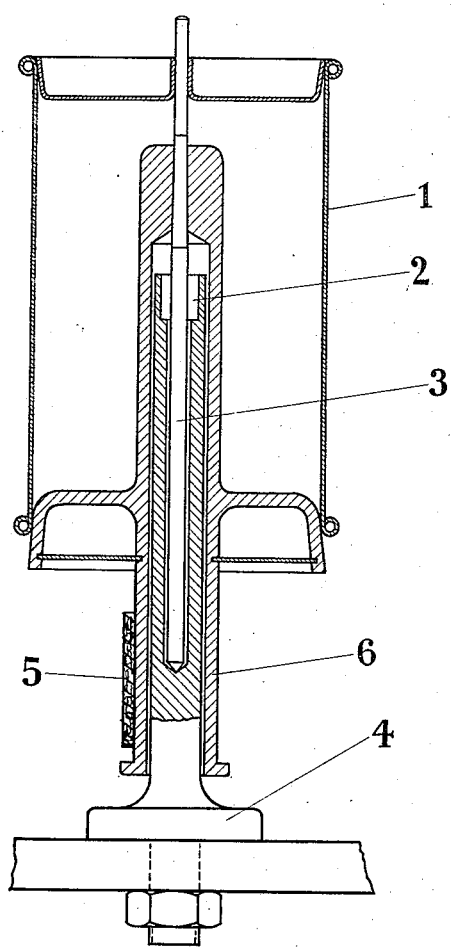
Inventor:

Patented July 9, 1940

2,207,495

UNITED STATES PATENT OFFICE 2,207,495

ROLLER BEARING TWISTING SPINDLE

Otto Bochmann, Remscheid-Lennep, Germany, assignor to Barmer Maschinenfabrik Aktiengesellschaft, Wuppertal-Oberbarmen, Germany Application December 31, 1936, Serial No. 118,669
In Germany January 20, 1936

2 Claims. (Cl. 308—228)

This invention relates to a roller bearing twisting spindle for removable bodies with large bore, such as spinning tubes for artificial silk. In the known spindles of this type the roller collar bearing in most instances is arranged near the driving means so as to be able to take up the pressure. However, it has been found that these spindles on the one hand consume much power and on the other hand are subjected to heavy wear so that they only have a relatively short life. These phenomena are due to the fact that the static and also the dynamic centrifugal forces occurring on the lever arm extending from the centre of gravity of the rotating mass to the collar bearing and produced by the mass placed on the spindle and the consequent shifting of the centre of gravity out of the axis of rotation of the spindle act on the roller bearing and also on the point of the spindle. Although these centrifugal forces are relatively small owing to the light mass, they nevertheless exert a stronger effect owing to the more or less long lever arm, so that increased consumption of power and increased wear occur. Another objection consists in that the spindle shaft must be made sufficiently strong to withstand these forces if it is not desired to run the danger of this spindle shaft breaking when passing through the critical number of revolutions. Spindles have become known the collar bearing of which is arranged in the centre of gravity of the rotating mass. But in this instance the spindle shaft is made as thick as possible and the collar bearing is fitted with play or supported by springs. This construction is open to the objection that the spindle, owing to the thick shaft does not become steady but always runs irregularly which has a correspondingly detrimental effect on the thread. Furthermore the collar bearing participates in the vibration so that, on the one hand, the bearing itself and, on the other hand, the supporting springs are continually stressed with the result that wear and even destruction especially of the springs takes place in a short time. Such spindles are therefore unsuitable for use in practice.

The object of the invention is to overcome these objections. This is attained by rigidly arranging the roller collar, in the case of roller collar-bearing twisting spindles for removable bodies with large bore, in or near the centre of gravity of the rotating mass, the spindle shaft being made correspondingly thin.

By this construction the relatively small static centrifugal forces, which extend through the centre of gravity of the rotating mass, are directly taken up by the bearing as bearing stresses, and the dynamic centrifugal forces are taken up by the correspondingly thin spindle shaft. The bearing therefore occupies the most favorable position under load, as any lever arm on which forces might act is avoided. This presents the advantage that the collar bearing is less stressed and consequently will have a longer life. Moreover, the spindle shaft can be made thin without any danger, with the result that an absolutely steady and perfect running of the spindle is ensured. This spindle also renders it possible to increase the speed of rotation, so that the power consumption is always maintained within permissible limits.

An embodiment of the invention is illustrated, by way of example, partly in vertical section and partly in elevation in the only figure of the accompanying drawing.

The twisting spindle carries a spinning tube 1. A roller bearing 2 for supporting the spindle shaft 3 is rigidly arranged in or near the centre of gravity of this rotating mass. For this purpose the spindle base 4 has a corresponding upward extension. All static centrifugal forces which occur are therefore taken up directly by the bearing as bearing stresses, as any leverage is avoided. The spindle shaft itself is made correspondingly thin for taking up the dynamic centrifugal forces. In this arrangement the twisting spindle itself can evidently be of any shape. It can also carry a bearing sleeve or a separate foot step for accommodating the spindle shaft. Essential is only the rigid arrangement of the roller bearing in the centre of gravity of the mass and the thinness of the spindle shaft. The spindle is driven on the wharve 6 for example by an endless belt 5 running along the same.

I claim:

1. In a support for spinning spindles, a tubular spindle supporting case, a whirl sleeve having a bore of large inside diameter surrounding the case, a spinning spindle on the sleeve, a spindle on which the sleeve, is secured which spindle is placed in the tubular supporting case with a clearance and whose diameter is so small that the axis of the spindle is free to co-incide with its "ideal" axis of rotation, and a roller bearing rigidly secured on the supporting case between the spindle and the case and arranged substantially at the center of gravity of the spinning spindle, said roller bearing comprising a unitary structure of longitudinally extending rollers directly engageable with the spindle and supporting case.

2. A roller bearing twisting spindle for carrying wound artificial silk spinning tubes, that is for carrying bodies with a large bore, comprising in combination a spindle shaft foot bearing, for said shaft, a collar bearing for said shaft constructed as a roller bearing and arranged approximately in the centre of gravity of the rotating mass, both said foot bearing and said collar bearing being of rigid construction, said spindle shaft being so that it adjusts itself in the gyroscope axis in spite of the rigid arrangement of said bearings.

OTTO BOCHMANN.